United States Patent
To

(10) Patent No.: US 7,734,740 B2
(45) Date of Patent: Jun. 8, 2010

(54) CONFIGURATION MANAGEMENT APPARATUS AND RELATED METHODS

(75) Inventor: William C To, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1164 days.

(21) Appl. No.: 10/826,942

(22) Filed: Apr. 16, 2004

(65) Prior Publication Data

US 2005/0235340 A1  Oct. 20, 2005

(51) Int. Cl.
G06F 15/177 (2006.01)

(52) U.S. Cl. ................................ 709/221; 709/220

(58) Field of Classification Search ................ 709/221, 709/223, 226
See application file for complete search history.

(56) References Cited

U.S. PATENT DOCUMENTS

| | | | | |
|---|---|---|---|---|
| 6,122,575 A | * | 9/2000 | Schmidt et al. | 701/29 |
| 6,363,423 B1 | * | 3/2002 | Chiles et al. | 709/224 |
| 6,401,013 B1 | * | 6/2002 | McElreath | 701/3 |
| 7,043,537 B1 | * | 5/2006 | Pratt | 709/220 |
| 2002/0095476 A1 | * | 7/2002 | Craik | 709/217 |
| 2003/0014426 A1 | * | 1/2003 | Gimbert et al. | 707/104.1 |
| 2003/0208579 A1 | * | 11/2003 | Brady et al. | 709/223 |
| 2003/0217363 A1 | * | 11/2003 | Brady et al. | 725/76 |
| 2004/0181690 A1 | * | 9/2004 | Rothermel et al. | 713/201 |

OTHER PUBLICATIONS

Wikipedia, Common Gateway Interface. Sep. 4, 2009.*
CGI—Common Gateway Interface; http://hoohoo.ncsa.uiuc.edu/cgi/intro/html.

* cited by examiner

Primary Examiner—Rupal D Dharia
Assistant Examiner—Ryan J Jakovac
(74) Attorney, Agent, or Firm—Harness, Dickey & Pierce, P.L.C.

(57) ABSTRACT

An apparatus for managing configuration of an element. The apparatus includes a computer that connects with the element to receive data from the element, and a server in the computer that includes the data in one or more web pages.

22 Claims, 12 Drawing Sheets

LRU PING STATUS

CBB ID: 2095431  SW VERSION: 2.18  UPDATE AIRCRAFT INFO 202
TAIL NUMBER: LINE001  AIRCRAFT TYPE: A344
DATE/TIME: WEDNESDAY, 10-MAR-04 22:37:15 GMT

| NO. | LRU NAME | IP ADDRESS | PING STATUS | UP TIME |
|---|---|---|---|---|
| 1. | CSM | 172.27.10.2 | UP | 0:36:38 |
| 2. | FSM SLOT 2 | 172.27.50.2 | UP | 0:35:48 |
| 3. | FSM SLOT 3 | 172.27.10.103 (FLASH OS) | UP | UNKNOWN |
| 4. | FSM SLOT 4 | 172.27.10.104 (FLASH OS) | UP | UNKNOWN |
| 5. | AIM | 172.27.20.2 | UP | 0:38:04 |
| 6. | EGM | 172.27.10.1 | UP | 0:36:58 |
| 7. | DTR | 172.31.0.1 | UP | UNKNOWN |

Sidebar menu:
- NEW CONTROLLER
- INITIAL DATALOAD (CSM)
- INITIAL DATALOAD (FSM)
- UPDATE LRU
- LOAD TO MSD
- LOAD TO LRU
- AUTOCONFIG CWLU
- MISCELLANEOUS
- LRU PING STATUS
- CONFIGURATION CHECK
- DELETE MSD
- COPY CD TO HD
- ONLINE DOCUMENT
- SET SATCOM PARAM
- RETRIEVE LOG FILES

FIG. 5

[DATA LOAD PAGE - MOZILLA]

FILE  EDIT  VIEW  GO  BOOKMARKS  TOOLS  WINDOW  HELP

BACK  FORWARD  RELOAD

HOME  BOOKMARKS  RED HAT NETWORK  SUPPORT  SHOP  PRODUCTS  TRAINING

[SEARCH]  [PRINT]

CONNEXION BY BOEING℠

CBB ID: 2095431    SW VERSION: 2.18    UPDATE AIRCRAFT INFO  202
TAIL NUMBER: LINE001  AIRCRAFT TYPE: A344

LOAD TO MSD

LAPTOP HARD DISK HAS THE FOLLOWING LOAD TO MSD INFORMATION

| HARDWARE | SW PART NUMBER |
|---|---|
| CMLU | 1.22SR58-04-2395 |
| AIM | CBB001020604 |
| CSM | CBB40-21026-004 |
| EGM | CBB45-21116-03 |
| AIM | COL32-1973-M003 |
| AIM | IO_TABLE_737 |
| AIM | IO_TABLE_747 |
| AIM | IO_TABLE_757 |
| AIM | IO_TABLE_777 |
| AIM | MNT001020604 |
| AIM | MNT002020604 |

508 — WILL PERFORM LOAD TO MSD, PLEASE CONFIRM?    [CONFIRM] — 516

NEW CONTROLLER
INITIAL DATALOAD (CSM)
INITIAL DATALOAD (FSM)
                          224
UPDATE LRU
LOAD TO MSD
LOAD TO LRU
AUTOCONFIG CMLU

MISCELLANEOUS
LRU PING STATUS
CONFIGURATION CHECK
DELETE MSD
COPY CD TO HD
ONLINE DOCUMENT
SET SATCOM PARAM
RETRIEVE LOG FILES

ENGINEERING
SYSTEM STATUS   224a
DO SNMP
VIEW LOG

```
<html>
<head>
<title>Top Page</title>
</head>

<body bgcolor=white>
<table valign=top cellpadding="0" cellspacing="0">
  <tr>
    <td>
    <a href="[[start_page]]" target=_top><img src="[[logo_image]]" width=170
height=50 align="left" alt="Company Logo" border="0"></a>
    </td>
    <td height=65>
    <table>
       [%foreach ([[top.choices]])%]
         <tr><td width=15> </td><td align=right><font
size="+1">[[top.line.[[foreach_var]].1]]:</font></td><td><font
size="+1">[[[top.line.[[foreach_var]].1]]]</font></td><td width=10> </td>
         <td width=15> </td><td align=right><font
size="+1">[[top.line.[[foreach_var]].2]]:</font></td><td><font
size="+1">[[[top.line.[[foreach_var]].2]]]</font></td></tr>
       [%endfor%]
    </table>
    </td>
    <td height=65>
    <table >
    <tr><td>   <a href=[[cgi_path]]/dl_dataload/init_aircraft_info
target=main><font size="+1">Update Aircraft Info</font></a>
    <tr><td> 
    </table>
    </td>
  </tr>
</table>
</body>
</html>
```

```
<html>
<head>
<title>Menu Page</title>
</head>

<body>
<table cellspacing="0" cellpadding="0" border="0">
  <tr>
    <td height=4 width=4 rowspan=110> </td>
  </tr>
  <tr>
    <td> </td>
    <td colspan=3>
    <!-- here begins real menu -->
    <table width=100% border=0 cellspacing="0" cellpadding="0">
      <!-- indent the menus -->
      <tr>
        <td width=4></td><td width=4></td>
      </tr>

[%if ("[[software_diag]]" eq "true") %]
      [%set (menu_title=[[menu_title_choices_engr]])%]
    [%elseif ("[[software_super]]" eq "true") %]
      [%set (menu_title=[[menu_title_choices_diag]])%]
    [%else%]
      [%set (menu_title=[[menu_title_choices]])%]
    [%endif%]
    [%foreach ([[menu_title]]) %]
      [%set (t_index=[[foreach_var]]) %]
        <tr><td><b><font size
="+1">[[menu_title.[[t_index]].text]]</font></b></td></tr>
        [%foreach ([[menu.[[t_index]].choices]]) %]
          <tr><td> <a href=[[cgi_path]]/[[menu.[[foreach_var]].page]]
target=main><font size="+1">[[menu.[[foreach_var]].text]]</font></a></td></tr>
        [%endfor%]
      <tr><td> </td></tr>
    [%endfor%]
        <!-- End of menu -->
    </table>
    </td>
  </tr>

</table>
</body>
</html>
```

```
cgi_path=/cgi-bin/dataload
start_page=/dataload.html
logo_image=/cbb_logo.jpg
laptop_sw_pn=726-21178-003 top.htm configuration
the top_choices defines number of lines seperated by ,
top_choices=1,2
top.line.1.1=CBB ID
top.line.1.2=SW Version
top.line.2.1=Tail Number
top.line.2.2=Aircraft Type
CBB ID=2095431
SW Version=2.18
Tail Number=LINE001
Aircraft Type=A344 menu.htm configuration
menu title
menu_title_choices=1,2,3
menu_title_choices_engr=1,2,3,4
menu_title_choices_diag=1,2,3,4,5
menu_title.1.text=New Controller
menu_title.2.text=Update LRU
menu_title.3.text=Miscellaneous
menu_title.4.text=Engineering
menu_title.5.text=Diagnostic
# different sub menu
# the menu_choices defines number of menus seperated by ,
menu.1.choices=1,4
menu.2.choices=5..7
menu.3.choices=10,11,12,13,14,31,15
menu.4.choices=30,20,21,22,23,24,2,3
menu.5.choices=50
```

```
menu.1.page=dl_cgi_dpu/dl_initial_dataload_csu.htm
menu.1.text=Initial Dataload(CSM)
menu.2.page=dl_cgi_dpu/dl_initial_dataload_egm.htm
menu.2.text=Initial Dataload(EGM)
menu.3.page=dl_cgi_dpu/dl_initial_dataload_aim.htm
menu.3.text=Initial Dataload(AIM)
menu.4.page=dl_cgi_dpu/dl_initial_dataload_fsm.htm
menu.4.text=Initial Dataload(FSM)
menu.5.page=dl_dataload/phase_1
menu.5.text=Load To MSD
menu.6.page=dl_dataload/phase_2
menu.6.text=Load To LRU
menu.7.page=dl_cgi_dpu/dl_cwlucfg.htm
menu.7.text=Autoconfig CWLU
menu.10.page=dl_cgi_dpu/dl_sysinfo_wait.htm
menu.10.text=LRU Ping Status
menu.11.page=dl_cgi_dpu/dl_sysconfig_main.htm
menu.11.text=Configuration Check
menu.12.page=dl_dataload/delete_msd
menu.12.text=Delete MSD
menu.13.page=dl_cgi_dpu/dl_copy_cd_to_hd.htm
menu.13.text=Copy CD to HD menu.14.page=dl_cgi_dpu/dl_onlinedoc.htm
menu.14.text=Online Document
menu.15.page=dl_retrieve_log/dl_retrieve_log
menu.15.text=Retrieve Log Files
menu.20.page=dl_cgi_dpu/dl_snmp.htm
menu.20.text=Do SNMP
menu.21.page=dl_cgi_dpu/dl_viewlog.htm
menu.21.text=View Log
menu.22.page=dl_cgi_dpu/dl_set_special.htm
menu.22.text=Set Special Flag
menu.23.page=dl_cgi_dpu/dl_latte_access.htm
menu.23.text=Latte Access
menu.24.page=dl_cgi_dpu/dl_set_csm_date.htm
menu.24.text=Set CSM Date
menu.30.page=dl_cgi_dpu/dl_misc_status.htm
menu.30.text=System Status
menu.31.page=dl_cgi_dpu/dl_satcomm.htm
menu.31.text=Set SatCom Param
menu.50.page=dl_cgi_dpu/dl_diagnostic.htm
menu.50.text=Software Diag software_diag=false
```

```
<html>
<head>
<title>Top Page</title>
</head>
<body bgcolor=white>
<table valign=top cellpadding="0" cellspacing="0">
   <tr>
     <td>
     <a href="/dataload.html" target=_top><img src="/cbb_logo.jpg" width=170
height=50 align="left" alt="Company Logo" border="0"></a>
     </td>

<td height=65>
     <table>
        <tr><td width=15> </td><td align=right><font size="+1">CBB
ID:</font></td><td><font size="+1">2095431</font></td><td width=10> </td>
        <td width=15> </td><td align=right><font size="+1">SW
Version:</font></td><td><font size="+1">2.18</font></td></tr>
        <tr><td width=15> </td><td align=right><font size="+1">Tail
Number:</font></td><td><font size="+1">LINE001</font></td><td width=10> </td>
        <td width=15> </td><td align=right><font size="+1">Aircraft
Type:</font></td><td><font size="+1">A344</font></td></tr>

</table>
     </td>
     <td height=65>
     <table >
     <tr><td>  <a href=/cgi-bin/dataload/dl_dataload/init_aircraft_info
target=main><font size="+1">Update Aircraft Info</font></a>
     <tr><td> 
     </table>
     </td>

</tr>
</table>
</body>
</html>
```

```
<html>
<head>
<title>Menu Page</title>
</head>
<body>
<table cellspacing="0" cellpadding="0" border="0">
  <tr>
    <td height=4 width=4 rowspan=110> </td>
  </tr>
<!--- first menu -->

<tr>
    <td> </td>
    <td colspan=3>
    <!-- here begins real menu -->
    <table width=100% border=0 cellspacing="0" cellpadding="0">
      <!-- indent the menus -->
      <tr>
         <td width=4></td><td width=4></td>
      </tr>

<!-- Menu -->
      <tr><td><b><font size ="+1">New Controller</font></b></td></tr>
          <tr><td> <a href=/cgi-
bin/dataload/dl_cgi_dpu/dl_initial_dataload_csu.htm target=main><font
size="+1">Initial Dataload(CSM)</font></a></td></tr>
          <tr><td> <a href=/cgi-
bin/dataload/dl_cgi_dpu/dl_initial_dataload_fsm.htm target=main><font
size="+1">Initial Dataload(FSM)</font></a></td></tr>
      <tr><td> </td></tr>
          <tr><td><b><font size ="+1">Update LRU</font></b></td></tr>
          <tr><td> <a href=/cgi-bin/dataload/dl_dataload/phase_1
target=main><font size="+1">Load To MSD</font></a></td></tr>
```

```
        <tr><td> <a href=/cgi-bin/dataload/dl_dataload/phase_2
target=main><font size='+1'>Load To LRU</font></a></td></tr>
        <tr><td> <a href=/cgi-bin/dataload/dl_cgi_dpu/dl_cwlucfg.htm
target=main><font size='+1'>Autoconfig CWLU</font></a></td></tr>
    <tr><td> </td></tr>
        <tr><td><b><font size ='+1'>Miscellaneous</font></b></td></tr>
        <tr><td> <a href=/cgi-bin/dataload/dl_cgi_dpu/dl_sysinfo_wait.htm
target=main><font size='+1'>LRU Ping Status</font></a></td></tr>
        <tr><td> <a href=/cgi-bin/dataload/dl_cgi_dpu/dl_sysconfig_main.htm
target=main><font size='+1'>Configuration Check</font></a></td></tr>

<tr><td> <a href=/cgi-bin/dataload/dl_dataload/delete_msd
target=main><font size='+1'>Delete MSD</font></a></td></tr>
        <tr><td> <a href=/cgi-bin/dataload/dl_cgi_dpu/dl_copy_cd_to_hd.htm
target=main><font size='+1'>Copy CD to HD</font></a></td></tr>
        <tr><td> <a href=/cgi-bin/dataload/dl_cgi_dpu/dl_onlinedoc.htm
target=main><font size='+1'>Online Document</font></a></td></tr>
        <tr><td> <a href=/cgi-bin/dataload/dl_cgi_dpu/dl_satcomm.htm
target=main><font size='+1'>Set SatCom Param</font></a></td></tr>
        <tr><td> <a href=/cgi-bin/dataload/dl_retrieve_log/dl_retrieve_log
target=main><font size='+1'>Retrieve Log Files</font></a></td></tr>
    <tr><td> </td></tr>

<!-- End of menu -->
    </table>
    </td>
  </tr>
</table>
</body>
</html>
```

FIG. 11B

CONFIGURATION MANAGEMENT APPARATUS AND RELATED METHODS

FIELD OF THE INVENTION

The present invention relates to management and maintenance systems and, more particularly, to an apparatus for managing configuration of an element such as a mobile platform.

BACKGROUND OF THE INVENTION

Maintaining a fleet of aircraft involves stringent testing and maintenance of hardware and software components of each aircraft. Records of the aircraft components are kept so that maintenance mechanics may determine what versions of hardware and/or software are in use on a given aircraft at a particular time. Such recordkeeping typically has been performed by the mechanics, who record aircraft configuration information on paper when maintenance is performed.

SUMMARY OF THE INVENTION

The present invention, in one preferred implementation, is directed to an apparatus for managing configuration of an element. The apparatus includes a computer that connects with the element to receive data from the element, and a server in the computer that includes the data in one or more web pages.

In another configuration, an apparatus for performing configuration management relative to an element includes a computer and a configuration file that receives data from the element. The configuration file is accessible by the computer. The computer formats the data from the configuration file for presentation as one or more web pages. The formatting is performed standalone using a server module of the computer.

In another implementation, a method of managing configuration of an element includes connecting a computer to the element. Data is caused to be transferred from the element to the computer. The transferred data is viewed in one or more web pages formatted by the computer standalone.

In yet another implementation, a computer-implemented method of providing configuration management relative to an element includes connecting with and receiving data from the element, and formatting the data in one or more web pages. The formatting is performed standalone.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 5 is a view of a web page configured in accordance with one implementation of the present invention;

FIG. 6 is a view of a web page configured in accordance with one implementation of the present invention;

FIG. 7 is a listing of "htm" code configured in accordance with one implementation of the present invention;

FIG. 8 is a listing of "htm" code configured in accordance with one implementation of the present invention;

FIG. 9A is a listing of a portion of a configuration file in accordance with one implementation of the present invention;

FIG. 9B is a listing of a portion of a configuration file in accordance with one implementation of the present invention;

FIG. 10 is a listing of HTML code configured in accordance with one implementation of the present invention;

FIG. 11A is a listing of HTML code configured in accordance with one implementation of the present invention; and FIG. 11B is a listing of HTML code configured in accordance with one implementation of the present invention.

DETAILED DESCRIPTION OF THE PREFERRED EMBODIMENTS

The following description of the preferred systems and methods is merely exemplary in nature and is in no way intended to limit the invention, its application, or uses. Although configurations of the present invention are described herein with reference to a fleet of aircraft, configurations of the invention are not so limited. Configurations are contemplated in connection with various systems and networks, including but not limited to other mobile platforms such as ships and trains. Various configurations could be implemented in connection with many different types of networks, systems and/or elements for which it is desired to provide management and/or maintenance.

Figure 1:
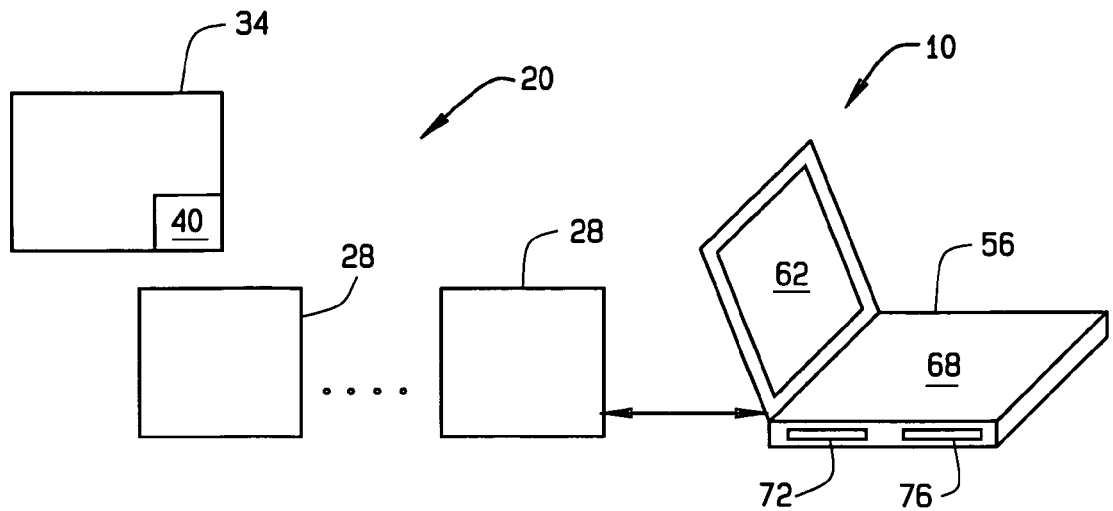
FIG. 1 is a block diagram view of an apparatus for managing an element in accordance with one configuration of the present invention.

An apparatus for managing an element in accordance with one configuration of the present invention is indicated generally in FIG. 1 by reference number 10. A plurality of elements 28 are included in a system 20. The elements 28 may be, for example, aircraft in a fleet. A management node 34, e.g., a network operations center, includes one or more processors 40 used, for example, to track and/or analyze data collected from the element(s) 28 as further described below. Configurations of the present invention also are contemplated in connection with systems which do not include a management node. The invention can also be implemented in connection with an element that is not part of a system.

The apparatus 10 includes a computer 56, for example, a laptop computer having a display screen 62 and a keyboard or other user input device 68. The computer 56 has a processor 72 and memory 76. As further described below, the computer 56 is operable to connect with an aircraft 28 to transmit data to and/or receive data from the aircraft 28. The computer 56 also is operable to include data received from the aircraft 28 in one or more web pages and to present such web pages, e.g., display such web page(s) on the display screen 62. The computer 56 can be used standalone to format and/or display such web pages. Unless otherwise stated, the computer 56 may be "connected" with an element 28 via wired or wireless connection.

When, for example, it is desired to perform aircraft management relative to one of the aircraft 28, a user connects the computer 56 to the aircraft and causes data to be transferred from the aircraft 28 to the computer 56. Such data may be displayed on the screen 62 in one or more web pages formatted by the computer standalone. Based, for example, on the transferred data, the user may use one of the web page(s) to select a management function as further described below.

Figure 2:
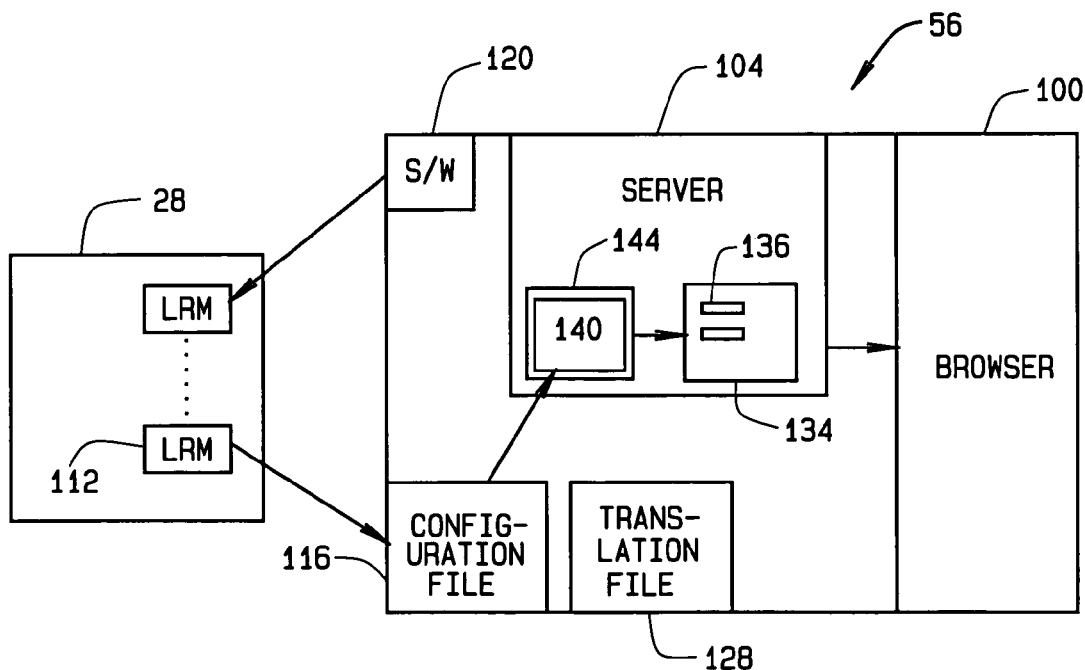
FIG. 2 is a block diagram of software modules of a computer in accordance with one configuration of the present invention.

The computer 56 includes a plurality of software and data modules as shown in FIG. 2. A web browser module 100 provides an interface between the computer 56 and a user of the computer 56. The computer 56 also includes a web server module 104 further described below. The computer 56 may retrieve data, for example, from one or more line replaceable modules (LRMs) 112 of the aircraft 28. The computer 56 may use simple network management protocol (SNMP) to retrieve such data, although other protocols could be used. Data retrieved from the aircraft 28 is stored in a configuration file 116 of the computer 56. The computer 56 may also be configured to send data to the aircraft 28. For example, one or more software modules 120 may be sent to update one or more LRMs 112. In the present configuration, the computer 56 includes an optional translation file 128 further described below.

The server 104 uses one or more web page descriptions or markups 134 written, for example, in hypertext markup language (HTML) to output web pages. A given web page description 134 may include static content, i.e., content that does not change over time. Additionally or alternatively, one or more of the descriptions 134 may include one or more constructs 136 used by the server 104 to insert dynamic content (i.e., content that may change over time) into a web page as further described below. Such construct(s) 136 may be used to obtain data from the configuration file 116 and to insert the data and/or content derived from such data into a web page. A construct processing module 140 written, for example, in perl, is executable by the server 104 via a script wrapper 144 (referred to in the present configuration as "cgi_dpu") to process the construct(s) 136 as further described below. The script 144 in the present configuration also is written in per. Other languages could be used, however, for the module 140 and script 144. It also should be noted that other languages besides HTML could be used to output web pages in other implementations of the present invention. The term "web page" as used herein refers to a page formatted using the server module 104. Although the invention can be implemented without accessing the Internet, pages formatted using the server 104 could be transported over the Internet in other implementations.

In one configuration, the construct processing module 140 uses a common gateway interface (CGI) of the server 104 to obtain data from the configuration file 116. The construct processing module 140, referred to in the present configuration as "dpu.pm", may have a size, for example, of approximately 30 kilobytes. The module 140 is placed, for example, in a cgi-bin directory of the server 104.

For a typical static link to a HTML page, a web page description may include the following:

<a href=http://www.xyz.com/main.html>Go to Main</a>

For a link with dynamic content update, a web page description may instead include the following:

<a href=http://www.xyz.com/cgi-bin/cgi_dpu/main.htm>Go to Main</a>

The foregoing statement instructs the server 104 to execute the script "cgi_dpu" and pass to it the name of the web page, in the present example, "main.htm". The optional notation ".htm" (or other notation) may be used instead of the extension ".html" to indicate a page that includes one or more constructs for dynamic update as further described below.

In one configuration, one or more data replacement constructs, e.g., as described in Table 1, may be used in creating web pages.

TABLE 1

Data Replacement Constructs [[ ]]

[[param_name]] -
  Look up param_name from configuration file and replace [[ ]]
  with the param_value from the configuration file. [[ ]] can be
  nested and is processed from right to left with the innermost [[ ]]
  evaluated first.
[[eval ( . . . )]] -
  Evaluate expression inside ( ) using perl and replace [[ ]] with the
  return result.
[[system ( . . . )]] -
  Execute system command inside ( ) and capture a
  standard system output (stdout) and replace [[ ]] with the
  captured result.

Additionally or alternatively, one or more logic processing constructs may be used as shown in Table 2.

TABLE 2

Logic Processing Constructs [% %]

[%if ( . . . )%] - [%endif%]
  Allow inclusion of a block of htm code if ( ) is true. Also supports
  [%elseif ( . . . )%] and [%else%] keywords within the "if" and "endif"
  block. Nested 'if' block is acceptable.
[%foreach ( . . . )%] - [%endfor%]
  Allow looping of a block of html code with a specific loop value.
  Following are three exemplary constructs for "foreach":
  1.
  [%foreach ("xx", "yy", "zz")%]
  htm code
  [%endfor%]
  2.
  [%foreach (n . . . m)%]
    htm code
    [%endfor%]
  3.
  [%foreach (@filename)%]
  htm code
  [%endfor%]

Note:
n and m are integer values and n is less than or equal to m.
"filename" is the name of a file that contains possible loop values, one on each line.
Also supports [%continue%] and [%break%] within a "foreach" block.
Nested "foreach" block is acceptable.
[%set ( . . . )%] - Set a variable to a particular value.
[%eval ( . . . )%] - Allow execution of a perl command.
[%system ( . . . )%] - Allow execution of a system command.
[%include ( . . . )%] - Allow inclusion of another htm file at this location.

The following examples demonstrate how dynamic content update can be provided. Preferably, the construct processing module 140 processes a given page including a construct 136 after the configuration file 116 has been updated. A data replacement construct may be used in the following manner. A line may appear in a web page description 134 as follows:

<td>[[abc]]<td>

The construct processing module 140 captures content inside the "[[ ]]", deletes all leading and trailing blanks and uses a resulting string as a name to fetch a value from the configuration file. For example, where a string "abc=snmp connection" is stored in the configuration file 116, the following result is sent to the browser 100:

<td>snmp connection<td>

As another example, a line may appear as follows:

<td>[[abc]]([[link]]):</td><td>[[[abc]]. [[link]]]]</td>

Where the configuration file 116 includes strings "link=1" and "snmp connection.1=OK", the following result is sent to the browser 100:

```
<td>snmp connection(1):</td><td>OK</td>
```

The foregoing result is obtained using the following processing sequence, in which processing is performed right-to-left with innermost "[[ ]]" processed first:

```
<td>[[abc]]([[link]]):</td><td>[[[[abc]].1]]</td>
<td>[[abc]]([[link]]):</td><td>[[snmp connection.1]]</td>
<td>[[abc]]([[link]]):</td><td>OK</td>
<td>[[abc]](1):</td><td>OK</td>
<td>snmp connection(1):</td><td>OK</td>
```

As another example, a line may appear as follows:
```
<td>[[eval ([[link]]+1)]]</td>
```
Processing the line results in the following string:
```
<td>2</td>
```
As another example, a line may appear as follows:
```
<td>The time is: [[system (date)]]</td>
```
A result of execution of a system command 'date' is inserted to produce the following:
```
<td>The time is: Wed Mar 10 09:45:22PST2004<td>
```
The following example shows how a logic processing construct may be used. A foreach block may be provided as follows:

```
[%foreach (1,2,3)%]
<tr><td>[[abc]]([[foreach_var]]):</td><td>[[[[abc]].[[foreach_var]]]]</td></tr>
[%endfor%]
```

The foregoing lines provide looping of HTML code within the foreach block three times with loop values of 1, 2 and 3. A predefined variable 'foreach_var' can be used to capture the loop value for each loop. It is assumed that the configuration file 116 includes the following values:
snmp connection.1=OK
snmp connection.2=NOT OK
snmp connection.3=OK
The following HTML code is produced:

```
<tr><td>snmp connection(1):</td><td>OK</td></tr>
<tr><td>snmp connection(2):</td><td>NOT OK</td></tr>
<tr><td>snmp connection(3):</td><td>OK</td></tr>
```

The following code illustrates how "[% if . . . " may be used:

```
[%if ("[[abc]].[[link]]" eq "OK")%]
<tr><td>[[abc]]([[link]]):</td><td>[[[[abc]].[[link]]]]</td></tr>
[%elseif ("[[abc]].[[link]]" ne "NOT OK")%]
<tr><td>[[abc]]([[link]]):</td><td bgcolor=yellow>[[[[abc]].[[link]]]]</td></tr>
[%else%]
<tr><td>[[abc]]([[link]]):</td><td bgcolor=red>[[[[abc]]. [[link]]]]</td></tr>
[%endif%]
```

Using the previously described configuration file values and if link=1, then the following code is produced:
```
<tr><td>snmp connection(1):</td><td>OK</td></tr>
```
If link=2, then the following code is produced:
```
<tr><td>snmp connection(2):</td><td bgcolor=red>NOT OK</td></tr>
```

The "if" keyword can support logical compare operators available in perl, e.g., "==", "!=", ">=" and "<=" (for numeric), "eq", "ne", and "gt" and "lt" (for string).

The following code illustrates how "[% set . . . " may be used:
[% set (connected=[[[[abc]].[[link]]]])%]
Using the previously described configuration file values and where link=1, the foregoing construct sets a variable 'connected' within a web page to "OK". To provide access to a "set" variable, the "[[ ]]" construct is used around that variable, for example:

```
[%if ("[[connected]]" eq "OK") %]
  . . .
[%endif%]
```

The following code illustrates how "[% system . . . ]" may be used:
[% system (./updateParameter)%]
The foregoing line causes the perl module 140 to call a system command "updateParameter" residing in a current directory. In one implementation, to ensure that the configuration file 116 has been updated, the same or a similar statement is put near the beginning of a given htm file. Since such a system call is performed synchronously, the perl module 140 waits until the system call is completed before continuing to process the rest of the htm file.

The following code illustrates how "[% include . . . " may be used:
[% include(my_header.htm)%]
The foregoing statement causes the perl module 140 to read in a file "my_header.htm" in the current directory and process it as if it were part of the htm file being processed.

The cgi script wrapper 144, named, for example, ""cgi_dpu", may be configured as follows:

```
#!/usr/bin/perl -w
use dpu;
$cgi_dpu = new dpu("conf_file", "xlate_file");
$cgi_dpu->process( );
```

The foregoing script may be made executable as follows:
(chmod+x cgi_dpu)

The foregoing script provides the perl module 140 with names of the configuration file 116 and the translation file 128 further described below. If access to the translation file is not desired, a NULL pointer may be passed to the perl module 140. If the perl module 140 is not installed in /usr/bin, an appropriate path may be entered in the script wrapper 144.

As previously discussed, the configuration file 116 includes information in the following format:
name=data where "name" is a parameter name and can be any ASCII text. One or more spaces can be included within the "name". "Data" is a parameter value and can be any ASCII text. One or more spaces can be included within the "data". In the present implementation, leading or trailing spaces are not used. A pound sign ("#") in the first character of a line designates a comment line and is ignored.

The translation file 128 is used to define one or more callback functions (e.g., system commands) to perform pre-get and pre-set processing as further described below. When a parameter is not defined in the configuration file 116, an entry can be included in the translation file 128 to provide content for such parameter. The translation file 128 includes information in the following format:

name:option=cmd where "name" is a parameter name and can be any ASCII text. One or more spaces can be included within the "name". The "option" can be, e.g., "iget", "iset", "get" and/or "set" as described below. The "cmd" is a system command (which may be, for example, a script or a program) and can be any ASCII text. Leading or trailing spaces are not used in the present implementation.

The "iget" option is used to define a system call to inform the current application that a parameter is about to be fetched from the configuration file 116. The "iget" option basically is a pre-"get" command option. A system call associated with an "iget" option exits with a value of zero (OK) or non-zero (NOT OK). If the exit value is OK, the perl module 140 will continue to try to fetch the replacement value string from the configuration file. If the exit value is NOT OK, the perl module 140 will skip the configuration file 116 and proceed to perform the "get" option described below.

The "iget" option may be used, for example, in the following manner:

current_transfer_speed:iget=./calculate_transfer_speed

Before a value "current_transfer_speed" is fetched from the configuration file 116, the foregoing statement may be used to allow a value for current transfer speed to be calculated and stored in the configuration file 116. The newly calculated value may be stored in the configuration file 116 before being fetched for display in a web page.

The "iset" option is used to define a system call to inform the current application that a value string is about to be stored to the configuration file 116 for a particular parameter. The value string may be entered, for example, by a user via a web page as further described below. The "iset" option basically is a pre-"set" command option. Before the command is executed, the value string is appended to the command line so the command can determine what to do with the new value string. For example, a line of code may appear as follows:

Aircraft ID:iset=./validate 'Aircraft ID'

The foregoing statement causes a system command called "validate" to be executed with two passed arguments. The first argument is 'Aircraft ID', and the second argument is the value string that is appended to the command line as previously described. If the appended string is validated, a zero (OK) exit value is returned. If the string is not validated, a nonzero (NOT OK) exit value is returned. If the exit value is OK, the new value string is stored in the configuration file. If the exit value is NOT OK, the configuration file is not updated and the "set" option is performed.

The "get" option is used to define a system call to get a value for a parameter, for example, if the parameter does not exist in the configuration file and/or if the "iget" option exits with a NOT OK status as described above. When the "get" command is executed, output is captured from a standard system output (stdout) as a value string for the parameter referred to by "name". For example, the following statement includes the "get" option:

DATE:get=date

To provide a parameter value for "DATE", a system call is made for "date", that is, a command "date" is executed that provides the current date in "stdout". The current date is captured from "stdout" and displayed as the value string for "DATE".

The "set" option is used to define a system call to set a value for a parameter, for example, if the parameter does not exist in the configuration file and/or if the "iset" option exits with a NOT OK status as described above. Before the command is executed, the value string is appended to the command line so the command can determine what to do with the new value string.

The "set" option may be used, for example, in the following manner:

PASSWD:set=set_passwd

The foregoing statement allows a user to enter a password that is not stored in the configuration file 116. The password entered by the user is passed as an argument to and is processed by the command "set_passwd", which may save the password in a privileged-access file.

The following two statements are examples of what might be included in the translation file 128:

DATE_TIME:get=date-u'+% A, % d-% b-% y % T GMT'

The foregoing statement may be used to obtain a current system date and time, which changes constantly and thus is not stored in the configuration file 116.

CLEAR_SHELL_WINDOW:get=rm-f shell_window.txt;touch shell_window.txt

The foregoing statement may be used, for example, to perform initialization prior to web page initialization for display. Two commands are executed to obtain a value for the parameter "CLEAR_SHELL_WINDOW". The first command, "rm-f shell_window.txt", deletes a file name "shell_window.txt". The second command, "touch shell_window.txt", creates a file name "shell_window.txt" having zero length. Since no value is sent to "stdout", the "get" option captures nothing, and so the value for "CLEAR_SHELL_WINDOW" will have an empty string.

One or more system commands may be implemented to access the configuration file 116 or the translation file 128 (also referred to respectively, for example, as "conf_file" and "xlate_file"). Several of such commands are shown in Table 3.

TABLE 3

System commands configGet filename param_name
  Examples:
    configGet cbb_server.conf 'Aircraft ID'
  The foregoing statement gets the parameter 'Aircraft ID' from a
configuration file 'cbb_server.conf' and displays the parameter
value to "stdout".
    configGet cbb_xlate.conf "UNAME:get"
  The foregoing statement gets the parameter 'UNAME:get' from a
translation file 'cbb_xlate.conf' and displays the parameter value
to "stdout".
configSet filename param_name param_value
  Examples:
    configSet cbb_server.conf 'Aircraft ID' 'x747-12345'
    configSet cbb_xlate.conf "UNAME:get" 'uname -a'
  The "configSet" command does not create an entry in a file designated by
"filename", and the command is ignored if the entry does not exist.
configAdd filename param_name param_value
  Examples:
    configAdd cbb_server.conf 'Aircraft ID' 'x747-12345'
    configAdd cbb_xlate.conf "UNAME:get" 'uname -a'
  The command "configAdd" creates an entry in a file designated by
"filename" if the entry does not exist.
configDelete filename param_name
  Examples:
    configDelete cbb_server.conf 'Aircraft ID'
    configDelete cbb_xlate.conf 'Uname:get'

TABLE 3-continued

System commands configDisplay filename param_name
The "configDisplay" command compares each line with a supply string and displays all lines containing the supply string.
Examples:
configDisplay cbb_server.conf 'Aircraft'
configDisplay cbb_xlate.conf 'UNAME'

An example shall now be described wherein a configuration of the foregoing apparatus is used in managing various systems and components of an aircraft. Generally, one or more web pages may be formatted using the server 104 and displayed using the browser 100. Such pages may include dynamic data pertaining to such aircraft. An exemplary web page is indicated generally in FIG. 3 by reference number 200. The page 200 includes a top frame area 202 in which, for example, a company logo 204 is displayed. The area 202 also includes aircraft information 208 specific to the given aircraft, including Aircraft Identifier, Tail Number and Aircraft Type. A Computer Software Version 212 also is displayed to keep track of which software version is being executed by the computer 56.

A button 218 may be activated by a user to update the aircraft information 208. The button 218 preferably is activated each time the computer 56 is connected to a new aircraft. Activating the button 218 causes the aircraft information fields 208 to be updated with data obtained from the aircraft via the configuration file 116.

The page 208 also includes a menu 224 of various functions that maybe activated by a user of the computer 56. Such functions generally may include but are not limited to configuration management functions, software upgrade functions, health status functions, troubleshooting functions, and engineering functions. The menu 224 may change dependent on an operating mode (e.g., whether the computer 56 is operating in a normal maintenance mode, or in an engineering mode in which additional diagnostic functions may be made available to the user).

Figure 3:
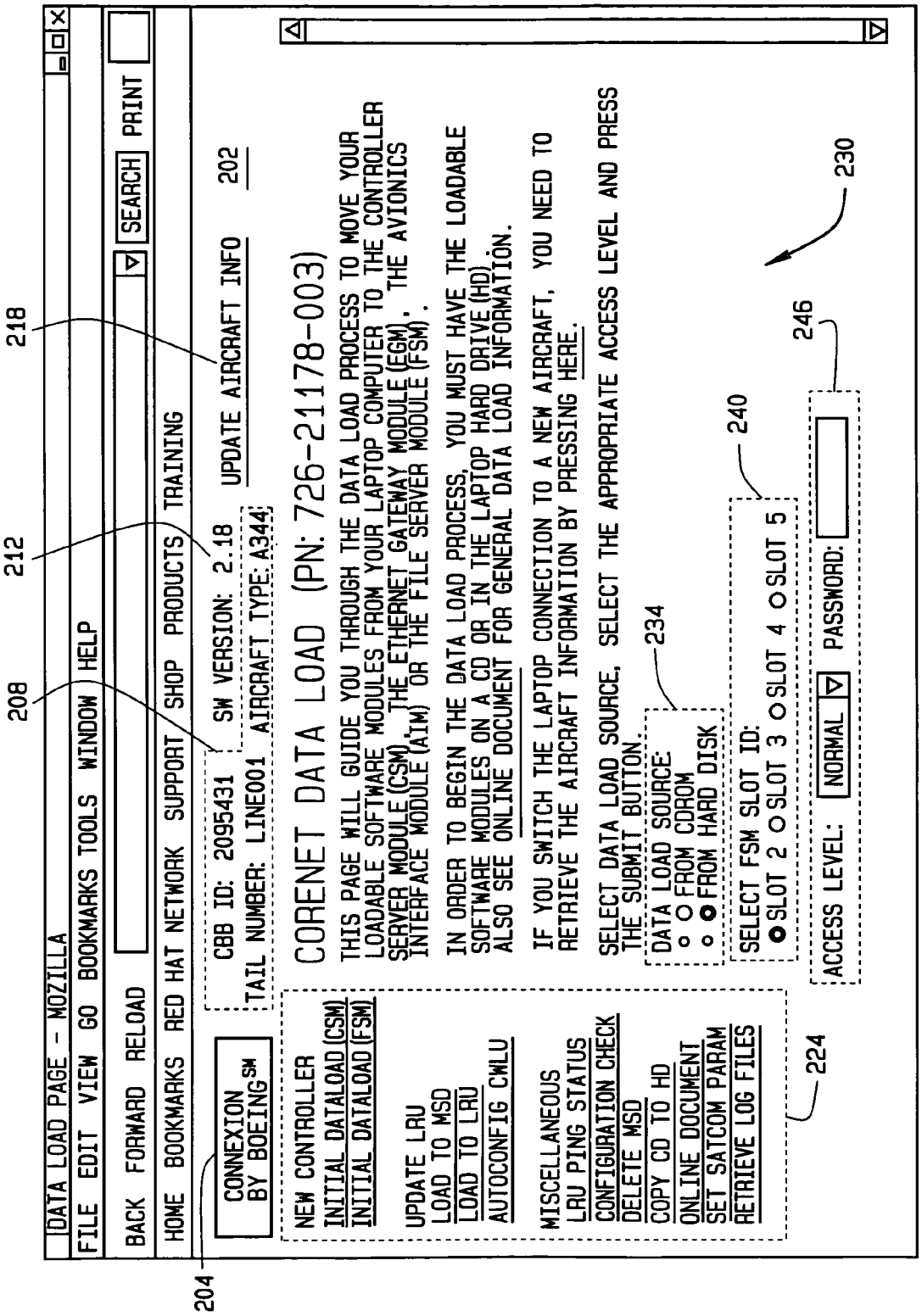
FIG. 3 is a view of a web page configured in accordance with one implementation of the present invention.

Generally, web page display areas may be configured to provide one or more functions as selected by the user. For example, as shown in FIG. 3, a display area indicated generally by reference number 230 allows the user to perform a software upgrade for a LRM. A source for upgrade software (e.g., CDROM or hard disk) may be designated in an area 234. LRM-specific information may be entered via buttons 240. To access high-level functions, the user may select an access level and enter a password in an area 246.

Figure 4:
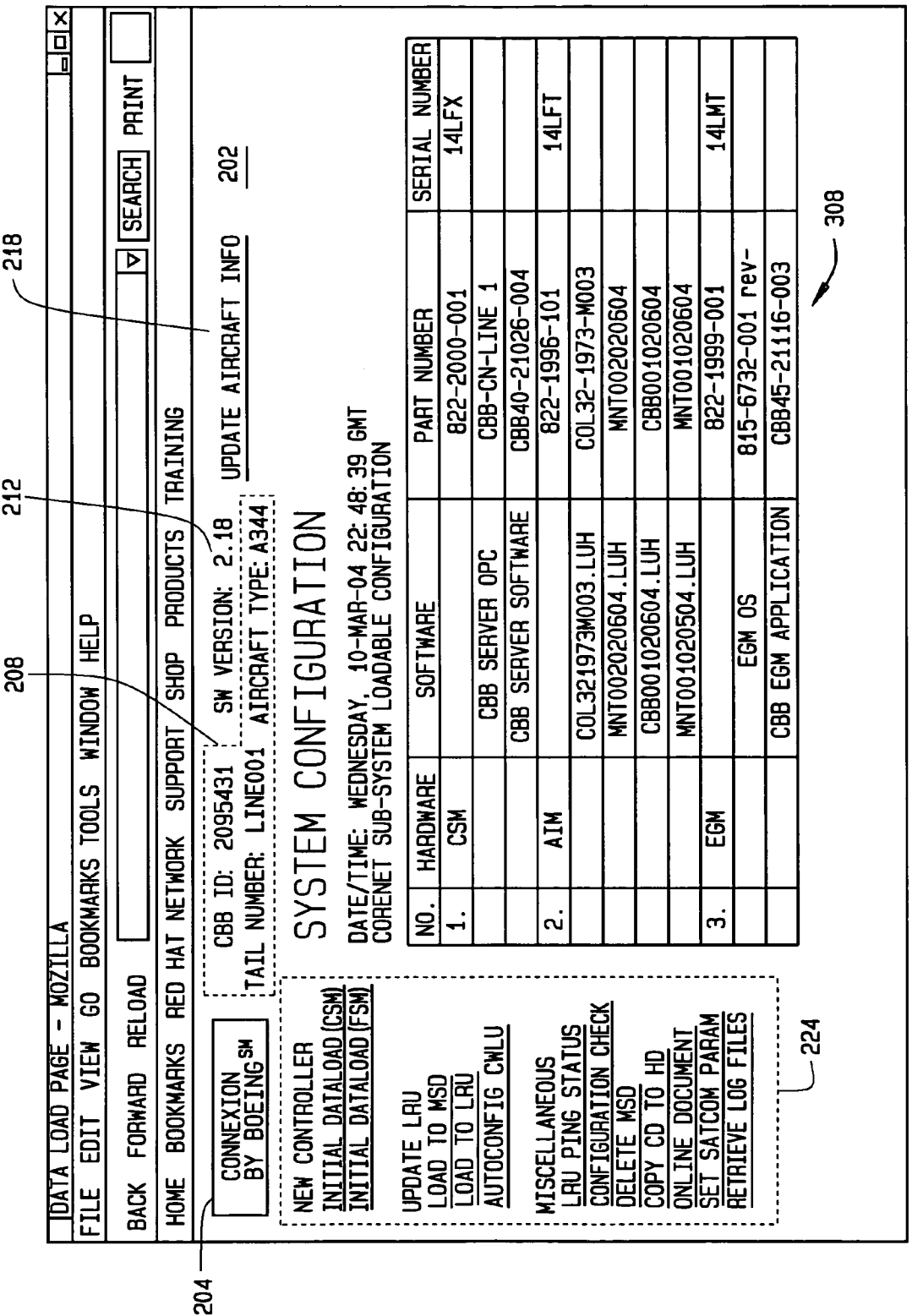
FIG. 4 is a view of a web page configured in accordance with one implementation of the present invention.

Another exemplary page is indicated generally by reference number 300 in FIG. 4. A display area indicated generally by reference number 308 allows the user to review, date-identify and save in the computer 56 configuration data pertaining to various LRMs for a given aircraft. In one configuration such data can be retrieved from the computer 56 and delivered to the management node 34, for example, to be included in a management data base.

Another exemplary page is indicated generally by reference number 400 in FIG. 5. A display area indicated generally by reference number 408 shows communication status with respect to a plurality of LRUs. Columns 412, 416 and 420 show respectively LRU name, IP address and ping status. Up time since last reboot also is shown for each LRU in a column 424. Data displayed in the columns 412, 416, 420 and 424 may be obtained from the configuration file 116, which preferably has been updated with current aircraft data by activation of the area 218.

Another page according to one configuration is indicated generally by reference number 500 in FIG. 6. The page 500 is displayed in response to a user having selected "Load To MSD" from the menu 224. A column 508 describes hardware and a column 516 describes part numbers affected by such a load operation. As previously discussed with reference to FIG. 3, the menu 224 may change according to an operating mode of the computer 56. Mode may be determined by a user access level and password entered in the page area 246 (shown in FIG. 3). As shown in FIG. 6, the menu 224 is extended to include menu items 224a when the computer 56 operates in an "Engineering" mode.

Other and additional functions may be made available via other and additional web pages. For example, one such web page (not shown) may be used to obtain SNMP data from various LRMs. Other and additional system status information such as aircraft-specific pin configuration and maintenance items (also referred to as discrete status), may be displayed on one or more web pages. Displays of such content may be refreshed periodically, e.g., every ten seconds. In one configuration, the computer 56 includes a Linux operating system and the server 104 is an Apache server having a perl interpreter. Other and additional operating systems and/or servers could be used in other configurations.

Exemplary "htm" code for the top frame area 202 is indicated generally in FIG. 7 by reference number 600. Exemplary "htm" code for the menu area 224 is indicated generally in FIG. 8 by reference number 650. In FIGS. 9A and 9B are shown portions (indicated generally by reference numbers 680a and 680b) of the configuration file 116 used in configuring the page shown in FIG. 1. A listing of HTML code is indicated generally in FIG. 10 by reference number 700. The code 700, which produces the top frame area 202, results from processing the "htm" code 600 using the "dpu.pm" module 140 and the configuration file 116 as previously described. Portions of HTML code are indicated generally in FIGS. 11A and 11B by reference numbers 750a and 750b. The code 750, which produces the menu frame area 224, results from processing the "htm" code 650 using the "dpu.pm" module 140 and the configuration file 116 as previously described.

The foregoing apparatus and methods make it convenient to fetch, store and display information from an aircraft or other system element. The apparatus is useful for upgrading software for a LRM, gathering fault and performance characteristics, and performing troubleshooting using various troubleshooting tools. Additionally, histories of information pertinent to various aircraft in a fleet could be compiled using configurations of the present invention. In systems in which a central management facility collects and uses such information, the foregoing apparatus and methods can simplify the collection of such information.

Because web server and internet browser software are used as an engine and user interface, an easily understandable language such as HTML can be used to format data for display. Even someone who is not technically knowledgeable could format data in such manner. The above-described constructs are flexible yet simple, and make it unnecessary to install a bulky, complicated server-side scripting package. The foregoing server performs as a standalone engine that provides a simple way to update web pages with dynamic content.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An apparatus for performing configuration management relative to an aircraft, the apparatus comprising:
 a portable computer having a processor and memory configured for connection with a plurality of components of the aircraft to retrieve data from one or more modules of the aircraft components;
 a configuration file resident in said portable computer, the configuration file having one or more parameters associated with said data from one or more modules of the aircraft components;
 a translation file resident in said portable computer, the translation file providing a system call for informing a current application that data associated with a parameter is about to be fetched from said configuration file, the translation file further including commands for providing data for one or more parameters that are determined to be missing from said configuration file; and
 a construct processing module of a web server software module resident in said computer to update one or more web pages using one or more constructs;
 the processor and memory configured to, when the portable computer is operating standalone:
 execute said system call to inform said construct processing module that data associated with a given parameter is about to be fetched from said configuration file;
 determine whether the given parameter is missing from said configuration file based on a status of said system call;
 if the given parameter is determined to be missing, execute a command from said translation file to provide data associated with said missing parameter to said construct processing module;
 execute the web server module to include at least some of the retrieved data in one or more web page markups for providing a plurality of maintenance and/or engineering functions selectable by a user of the computer and performable via the computer as to one or more of the components of the aircraft; and
 execute a web browser module resident in the portable computer and in communication with the server module to display the one or more web page markups as one or more web pages on a display of the portable computer.

2. The apparatus of claim 1 wherein the maintenance and/or engineering functions comprise one or more of the following: a configuration management function, a software upgrade function, a health status function, and a troubleshooting function.

3. The apparatus of claim 1, wherein the computer is further configured to execute a command from the translation file to calculate the data associated with the given parameter and store the calculated data in the configuration file before fetching the calculated data from the configuration file.

4. The apparatus of claim 1, wherein, if the given parameter is determined to be missing, the data associated with the given parameter is not retrievable from the aircraft components.

5. The apparatus of claim 1, further comprising a script executable by the processor through the server to activate the construct processing module.

6. The apparatus of claim 1, wherein the construct processing module is configured to use a common gateway interface of the server to obtain data from the configuration file.

7. The apparatus of claim 1, wherein the aircraft is included in a fleet managed via a network operations center, the computer further operable to deliver at least one of the data from the configuration file and the one or more web pages specific to a given one of the aircraft to the network operations center.

8. The apparatus of claim 1, the computer further operable to update software included in at least one of the components of the aircraft, collect performance data from at least one of the components of the aircraft, and operate a troubleshooting tool relative to at least one of the components of the aircraft.

9. An apparatus for performing configuration management relative to an aircraft, the apparatus comprising:
 a portable computer having a processor and memory, the computer connectible with the aircraft to transmit data to and retrieve data from a plurality of modules included in a plurality of components of the aircraft, the data pertaining to a plurality of maintenance and/or engineering functions performable as to the one or more components of the aircraft;
 a configuration file configured in the computer to receive data transmitted from the one or more aircraft components to populate a plurality of parameters in the configuration file associated with the data;
 a translation file configured in the computer and providing a system call for informing a current application that data associated with a parameter is about to be fetched from the configuration file, the translation file further including one or more commands for providing data for one or more parameters determined not to be present in the configuration file; and
 a web server software module residing on the computer and having a construct processing module, the server and construct processing module configured to use one or more constructs to dynamically format at least some of the data from the configuration file in one or more web pages for presentation by a web browser resident in the computer to a user of the computer via a display of the computer;
 the computer configured to, when operating standalone;
 execute the system call to inform the construct processing module that data associated with a given parameter is about to be fetched from the configuration file;
 based on a status of the system call, determine whether the given parameter is present in the configuration file; and
 if the given parameter is determined not to be present, execute a command from the translation file to provide data for the given parameter;
 at least one of the web pages dynamically formattable using the parameter data to indicate aircraft hardware components and software subcomponents potentially affected by one of the maintenance actions.

10. The apparatus of claim 9, wherein the computer is configured to transmit a loadable software module to the one or more aircraft components to update one of the modules of the one or more aircraft components.

11. The apparatus of claim 10, the browser configured to display a web page based on input by the user to the computer.

12. The apparatus of claim 9 wherein the computer is configured to retrieve the data from the one or more aircraft components using a simple network management protocol.

13. The apparatus of claim 9, the construct processing module configured to obtain data from the configuration file using a common gateway interface (CGI) of the server that does not interface with an internet.

14. A method of managing configuration of an aircraft, the method comprising:

connecting a portable computer to the aircraft for communication with one or more software modules resident in one or more components of the aircraft, the computer having resident therein: (a) a configuration file including a plurality of parameters populatable with data from the aircraft, (b) a translation file providing a system call for informing a current application that data associated with a parameter is about to be fetched from the configuration file, the translation file further including one or more commands for providing data for one or more parameters determined not to be included in the configuration file, (c) a web browser software module, and (d) a web server software module having a construct processing module that uses constructs to update web pages for service by the web server module to the web browser module;

operating the computer to retrieve from the one or more modules data describing (a) one or more hardware components of the aircraft and (b) software resident in the one or more hardware components, and to use the retrieved data to populate at least some of the configuration file parameters; and using the browser module, viewing the retrieved data and one or more user-selectable management functions relating to the retrieved data on a display of the computer in one or more web pages formatted and displayed by a processor of the computer, the one or more web gages formatted by the server and construct processing module using data provided by execution of one or more of the translation file commands based on a determination by the computer, after execution of the system call and based on a status of the system call, that a parameter is missing from the configuration file;

the method performed without accessing the Internet.

15. The method of claim 14, further comprising selecting a management function based on the retrieved data, the selecting performed using one of the one or more web pages.

16. The method of claim 14, wherein selecting a management function comprises selecting one of the following: updating the software resident in the one or more hardware components of the aircraft, collecting performance data from the aircraft components, and operating a troubleshooting tool relative to the aircraft components.

17. A method of providing configuration management relative to an aircraft, the method performed by a portable computer having a processor and memory, the method comprising:

the processor causing the portable computer to access one or more components of an aircraft and to retrieve data from the one or more components in response to a user request received via a web browser software module and web server software module resident in the portable computer, the server module including a construct processing module for updating web pages using one or more constructs;

the processor using the retrieved data to populate at least some of a plurality of parameters in a configuration file of the computer, the computer further including a translation file providing one or more system calls for informing a current application that data associated with a parameter is about to be fetched from the configuration file, one of the system calls further informing the current application that data associated with a given parameter is to be calculated and stored in the configuration file before being fetched from the configuration file, the translation file further including one or more commands for providing data for one or more parameters determined not to be included in the configuration file;

the processor executing the one of the system calls to inform the construct processing module that data associated with the given parameter is about to be calculated and fetched from the configuration file, and based on a status of the one of the system calls, determining whether the given parameter is included in the configuration file, and based on the determining, executing a command from the translation file to provide data for the given parameter;

the processor executing the web sewer module to dynamically format at least some of the data retrieved from the one or more aircraft components into one or more web page markups for display as one or more web pages via the browser module;

the processor receiving user input via the browser module indicating a management function to be performed on at least one of the one or more aircraft components; and the processor causing software to be downloaded from the portable computer to the at least one of the one or more components in response to the user input.

18. The method of claim 17, the processor causing the portable computer to access one or more line replaceable units of the aircraft, the method further comprising the processor causing a ping status to be displayed for each of one or more of the one or more line replaceable units of the aircraft.

19. The method of claim 17, further comprising the processor displaying data describing (a) one or more hardware components of the aircraft and (b) software resident in the one or more hardware components.

20. The method of claim 17, further comprising transferring data to the one or more aircraft components based on user input via one of the one or more web pages.

21. The method of claim 17, wherein the data associated with the given parameter is not retrievable from the aircraft components.

22. The method of claim 17, wherein the processor uses a construct processing module of the server to obtain the data via a common gateway interface (CGI), the CGI executable in the computer when the computer is standalone.

* * * * *